United States Patent [19]

Taylor

[11] Patent Number: 4,592,968

[45] Date of Patent: Jun. 3, 1986

[54] COKE AND GRAPHITE FILLED SEPARATOR PLATE FOR ELECTROCHEMICAL CELLS

[75] Inventor: William A. Taylor, Glastonbury, Conn.

[73] Assignee: International Fuel Cells Corporation, South Windsor, Conn.

[21] Appl. No.: 756,473

[22] Filed: Jul. 18, 1985

[51] Int. Cl.[4] .............................................. H01M 2/16
[52] U.S. Cl. ..................................... 429/34; 429/247; 429/249; 429/253
[58] Field of Search ................. 429/34, 247, 249, 251, 429/253; 264/29.5, 29.7, 105, 236; 423/499

[56] References Cited

U.S. PATENT DOCUMENTS

| | | | |
|---|---|---|---|
| 3,391,103 | 7/1968 | Mueller | 260/38 |
| 3,968,075 | 7/1976 | Doucette et al. | 260/42.25 |
| 4,301,222 | 11/1981 | Emanuelson et al. | 429/251 |
| 4,360,485 | 11/1982 | Emanuelson et al. | 264/29.5 |

FOREIGN PATENT DOCUMENTS 1240793  7/1971  United Kingdom .
551347   6/1977  U.S.S.R. .

OTHER PUBLICATIONS

Chemical Abstracts, 87: 6912s (vol. 87, 1977).
Chemical Abstract, 87:27667F (vol. 87, 1977).

*Primary Examiner*—Anthony Skapars
*Attorney, Agent, or Firm*—A. Dean Olson

[57] ABSTRACT

An electrochemical cell separator plate formed from a composition of carbonizable resin, coke, and graphite particles, and methods of making and using the same. The separator plate has an improved balance of properties such as flexural modulus. The plates are formed by molding a composition of carbonizable resin, coke, and graphite particles, surface grinding the plate and then carbonizing and graphitizing the plate. The composition comprises about 40% to about 60% of carbonizable resin and about 60% to about 40% of a coke-graphite mixture. The coke-graphite mixture comprises about 30% to about 90% of coke particles and about 70% to about 10% of graphite particles. These separator plates may be used in, for example, fuel cells.

12 Claims, No Drawings

COKE AND GRAPHITE FILLED SEPARATOR PLATE FOR ELECTROCHEMICAL CELLS

CROSS REFERENCE TO RELATED APPLICATIONS

Attention is directed to commonly assigned copending application, Ser. No. 686,063, filed Dec. 24, 1984, entitled "Coke Filled Separator Plate for Electrochemical Cells", William Taylor and Gregory Sandelli, which discloses material similar to that used in the present application, the disclosure of which is incorporated by reference.

DESCRIPTION

1. Technical Field

The field of art to which this invention pertains is molded articles produced from carbonizable material, particularly adapted for use in electrochemical cells.

2. Background Art

Graphitized electrochemical separator plates for use in fuel cells are well known in the fuel cell industry. A typical fuel cell comprises a plurality of individual cells, each cell comprising an anode, a cathode and an electrolyte. The fuel cells are typically stacked together to produce a unit with the desired electrical operating characteristics. The cells are separated from each other by separator plates.

Typically, separator plates are thin, molded structures formed from a composite of graphite and a thermosetting phenolic resin. It is critical to select a resin which is carbonizable. After the plate has been molded and surface ground, the plate is heat treated to carbonize the resin, and then further heat treated to graphitize the carbonized plate. These graphitized separator plates are particularly useful in fuel cells wherein the electrolyte is phosphoric acid and corrosion resistant separator plates are required.

The components of a phosphoric acid fuel cell, in which the reactants are hydrogen and oxygen, are subjected to severe operating conditions and require certain physical characteristics in order to perform adequately and provide the fuel cell with a reasonably long life expectancy. The plate should be thin and should have a low permeability, especially to hydrogen gas. Other important plate properties include structural integrity, in particular, flexural strength, flexural modulus and plate density.

Graphitized separator plates manufactured from carbonizable resin and graphite particles for use in electrochemical cells are known in the art. See commonly assigned U.S. Pat. Nos. 4,301,222 and 4,360,485, the disclosures of which are incorporated by reference.

Although the electrochemical cell separator plates of the prior art have performed well, there is a constant search for plates with improved properties.

DISCLOSURE OF INVENTION

This invention is directed at electrochemical cell separator plates comprising the molded, carbonized and graphitized product formed from a carbonizable and graphitizable molding composition comprising about 40 weight % (all percents given by weight) to about 60% of carbonizable resin and about 60% to about 40% of a coke-graphite mixture. The mixture comprises about 30% to about 90% of coke particles and about 70% to about 10% of graphite particles.

Another aspect of this invention is a method of manufacturing electrochemical cell separator plates wherein the plate is molded at sufficient heat and pressure to densify the plate, the plate surface is ground, the surface ground plate is heated at a sufficient temperature to carbonize the resin in the molded plate, and the plate is then heated to graphitize the plate. The plate is produced by using a carbonizable and graphitizable molding composition comprising about 40% to about 60% of carbonizable resin and about 60% to about 40% of a coke-graphite mixture. The coke-graphite mixture comprises about 30% to about 90% of coke particles and about 70% to about 10% of graphite particles.

Another aspect of this invention is a long-life fuel cell of the type comprising a plurality of cells, each cell comprising an anode, a cathode, electrolyte material and separator plates. The fuel cell incorporates carbonized and graphitized separator plates formed from a carbonizable and graphitizable molding composition comprising about 40% to about 60% of carbonizable resin and about 60% to about 40% of a coke-graphite mixture. The coke-graphite mixture comprises about 30% to about 90% of coke particles, and about 70% to about 10% of graphite particles.

This discovery provides the electrochemical industry with dense separator plates that are both simple and inexpensive to make while providing an improved balance of properties such as flexural modulus. This provides a significant advancement, for instance, to the fuel cell industry in their quest for a long-life fuel cell.

Other features and advantages will be apparent from the specification and claims which illustrate an embodiment of the invention.

DESCRIPTION OF PREFERRED EMBODIMENTS

The graphite powder used to make the plates of the present invention must be substantially 100% graphite. The characteristics and properties of the graphite powder used in the molding of the fuel cell separator plates of the present invention are critical to attaining the desired properties and characteristics in the finished plate. Graphite particle size, shape, purity, and density are all important, as discussed in detail below.

Very high purity graphite powder is critical to obtaining satisfactory plates. As used herein, an impurity is any material, other than graphite, which melts, evaporates, decomposes or interacts with either the graphite, the resin as it decomposes, or with the carbonized resin; or which ignites during carbonizing or graphitizing of the plate. These types of impurities cause voids or pin holes through the finished plate. An impurity may also be foreign material remaining in the separator which is not chemically or electrically compatible with the fuel cell environment, resulting in a higher corrosion rate or contamination of the electrolyte and ultimately the fuel cell catalyst. The most harmful impurities are lead, copper, bismuth, silver, cadmium, mercury and arsenic. The total amount of these impurities should not exceed about 100 parts per million (ppm) and is preferably less than 20 ppm. Other less harmful impurities include silicon, iron, sodium and potassium. The total of all impurities in the graphite powder must not exceed 1500 ppm and is preferably less than 900 pm, since too high a total will result in an excessively porous plate due to the volatilization of these impurities during heat treatment. Notwithstanding the foregoing, impurities cannot be tolerated in any amount which comprise particles greater than about 10 mils, as these particles would cause large, unacceptable defects in the finished plates.

Any graphite particle size distribution which produces a plate with an acceptable density of about 1.75 grams per cubic centimeter (g/cm$^3$) and will encourage a uniform resin distribution on a microscale (i.e., around each individual graphite particle) may be used in the practice of this invention. The most important and critical aspect of the particle size distribution is the required high percentage of larger particles. Table I below, details a preferred particle size distribution.

TABLE I

Preferred Graphite Particle Size Distribution

| Particle Size Range Microns (u) | | Weight Percent |
|---|---|---|
| greater than | 120 | 0–5 |
| | 100–120 | 5–10 |
| | 50–100 | 50–60 |
| | 40–50 | 10–15 |
| | 15–40 | 15–25 |
| less than | 15 | 0–5 |

The shape of the graphite particles also has a significant effect on the properties and characteristics of the finished separator plate. It has been determined that particles which tend to be granular (i.e., three-dimensional rather than like small flat plates or long rods which tend to be two-dimensional) minimize the likelihood or extent to which the graphite particles take on a preferred orientation within the plate during lateral material flow at the time of molding. Preferred graphite orientation has been demonstrated to cause nonuniform shrinkage during carbonizing due to induced resin maldistribution. The nonuniform shrinkage is exhibited as severe surface roughness, cracks and increased brittleness in the finished separator plates.

To determine particle shape, the longest and shortest dimensions of a significant number of particles are measured from a photomicrograph of a sample of the graphite powder. What is herein defined as an "aspect ratio" for each particle is calculated as the difference between the longest and shortest measurement divided by the longest measurement. Note that a spherical particle would have an aspect ratio of 0.0. The aspect ratio of a rod-like or a plate-like particle will, of course, depend upon its particular orientation in the photograph; however, on average these particles will have aspect ratios well in excess of 0.5. For purposes of the present invention the aspect ratios for all the measured particles are added together, and the sum is divided by the total number of particles measured to arrive at an "average aspect ratio" for the powder. It must be kept in mind that most graphite powders will have a mixture of sphere-like (granular), rod-like, and plate-like particles, so that the average aspect ratio is actually an indication of the relative proportion of sphere-like particles to rod-like and plate-like particles. Separator plates have been made using powder mixtures having average aspect ratios of 0.45, 0.51, and 0.53; and these plates were unacceptable. To be acceptable for purposes of the present invention it is believed the graphite powders should have average aspect ratios of less than 0.40.

The density of the graphite particles is also critical to the present invention. A particle density of 2.0 g/cm$^3$ is needed to assure acceptable plates because, for instance electrical and thermal conductivity are all adversely affected by too low a particle density. Graphite particles with acceptable properties include Grade 60 particles, air classified to remove particles less than 20$\mu$, available from Airco Speer (St. Mary's, Pa).

Any coke capable of producing separator plates with good characteristics may be used in these coke-graphite separator plates. The coke used in the practice of this invention will preferably be petroleum coke. It is particularly preferred to use high purity petroleum coke. Petroleum coke is typically made by heating petroleum pitch and then calcining the pitch to produce a thermal degradation or decomposition of the hydrocarbons in the pitch to produce what is known as coke. The coke is then granulated and is typically purchased as a powder. The coke useful in the practice of this invention will typically have a sufficient particle size distribution such that minimal fracture of carbonized resin bonds occurs for a given separator plate thickness. The particle size is directly related to the size of the component to be molded. Table II below, details an estimated preferred particle size distribution.

TABLE II

Preferred Coke Particle Size Distribution

| Particle Size Range (Microns) | | Weight Percent |
|---|---|---|
| greater than | 149 | 0% |
| | 74–149 | 2–10% |
| | 44–74 | 50–80% |
| less than | 74 | 90–100% |
| less than | 44 | 50–80% |

It is critical in the practice of this invention to ascertain the correct coke particle size for a given thickness of the molded object. The coke particle size distribution is similarly determined in accordance with the component to be molded. The petroleum coke which can be used in the practice of this invention includes Airco Grade 90 petroleum coke manufactured by Airco Carbon Company (Saint Mary's, Pa.), and Asbury CF70-W coke manufactured by Asbury Graphite Mills (Asbury, N.J.). The coke is preferably of high purity, for example, a precursor of a high or intermediate purity graphite will produce high density graphite.

As with the graphite particles the aspect ratio of the coke particles is important. The coke particles will have an aspect ratio sufficient to produce a graphitized separator plate having sufficient flexural strength and structural characteristics. Aspect ratio is defined as the ratio of the difference between the length and width of a particle divided by the length of that particle. Typically the aspect ratio will be less than about 0.5 and preferably about 0.35.

The resins which can be used in the practice of this invention are carbonizable resins such as coal tar or petroleum pitch resins, furfural resins, etc. It is preferred that the resins are capable of virtually complete carbonization and have a carbon yield greater than 50%. The preferred resins are the thermo-setting phenol-aldehyde resins, both novolacs and resols. It is especially preferred that the resin is phenol-formaldehyde novolac. Phenol-aldehyde resins are well known in the art and are typically manufactured by reacting phenol with an aldehyde, such as formaldehyde, in the presence of a basic catalyst. When the process is varied and an acid catalyst is used, a novolac resin is produced. A resin which may be used in the practice of this invention is Reichhold Chemical Company (Niagara Falls, N.Y.) grade 24-655 phenolic resin or grade 29-810 phenolic resin. Other phenol formaldehyde resins that can be used to manufacture the separator plates of this invention include the following resins proprietary to Plastics Engineering Company phenolic resin nos. 1339, 1436 and 1442 manufactured by Plastics Engineering Company, (Sheboygan, Wis.). In particular, phenolic resin number 1436 was used to make a satisfactory graphitized separator plate.

The carbonizable resin, coke and graphite particles may be combined in any proportion that results in a separator plate that has properties such that the separator plate functions for those applications described below. It is preferred that about 40% to about 60% of the molding compound is carbonizable resin and about 60% to about 40% of the molding compound is a coke-graphite mixture. This proportion of carbonizable resin assures minimal voids within the finished plate. It is also preferred to use a coke-graphite mixture that has about 30% to about 90% of coke particles and about 70% to about 10% of graphite particles. It is especially preferred to use about 40% coke particles and about 60% graphite particles. The proportion of coke to graphite is important as this provides, for instance, the maximum packing.

Beds of equal-sized spheres generally contain a 36–40% void space. However, it is believed that the void space can be minimized utilizing a bimodal spherical packing system having a seven-fold difference in the sizes of the particles. This maximum packing efficiency drops off rapidly as the diameter ratio falls below seven. In most powder systems it is impractical and uneconomical to separate particle distributions into single diameter fractions and recombine selected fractions to achieve maximum packing. However, packed density can be increased by adding small particles of one size distribution to large particles of another size distribution. In addition, in this invention some room must be left in the packed bed for the resin to bind the particles together.

As practiced in this invention the coke particles are the smaller of the particles, because if they are large, they swell during graphitization resulting in rupture of the carbonized resin bonds and in loss of structural integrity. It is surprising that as coke particles swell and push graphite particles aside, and then shrink, there are not interactions that result in inferior plates such as plates with voids. However, it is believed that as the coke particles shrink, during graphitization the resin pulls all particles together into a uniform dense structure.

Other additives conventionally used in the art for compression molding phenolic resins may be used to manufacture the electrochemical plates of this invention. For example, sufficient amounts of lubricants, mold release agents, etc. may be included in the molding compositions of this invention to improve the molding process parameters.

To manufacture the separator plates of this invention, initially the dry graphite and dry coke are mixed with the dry powdered phenolic resin for a sufficient period of time to achieve a uniform mix. Any dry mixing process can be utilized to accomplish the homogeneous powder of the components. Typically the components are mixed for about three to about five minutes, more typically about three minutes to about four minutes, and preferably about three minutes to about three and one-half minutes to achieve a homogeneous mixture in a mixing means such as a Littleford blender, manufactured by Littleford Company (Covington, Ky.) or a Nauta blende manufactured by J. H. Day Company (Ohio). It is desirable to further compound the dry molding mixture. Compounding helps wet the filler particles with resin so as to obtain sufficient homogeneity and sufficient consistency in the molded plate resulting in a plate that has good characteristics such as corrosion resistance. This is typically done by hot granulation and pelletizing using processes and equipment conventional and known in the art for producing phenolic molding compounds. Typically, whether further compounding is required depends upon the particular characteristics of the resin selected. Compounding and hot milling of phenolic molding compounds is disclosed in *Polymer Chemistry: An Introduction,* Seymour, R. V., and Carraher, Jr., C., P. 225, Marcel Dekker, Inc., New York, 1981.

The molding composition is typically preformed and then molded in conventional compression molding equipment with sufficient heat and pressure and for a sufficient time period to provide a molded plate with a density of about 1.58 g/cm$^3$ to about 1.62 g/cm$^3$, more typically about 1.58 g/cm$^3$ to about 1.60 g/cm$^3$, and preferably about 1.59 g/cm$^3$ to about 1.60 g/cm$^3$. The plates are typically molded at a temperature of about 250° F. (121° C.) to about 350° F. (177° C.), more typically about 275° F. (135° C.) to about 350° F. (177° C.), and preferably about 300° F. (149° C.) to about 350° F. (177° C.), at a pressure typically about 500 pounds per square inch (psi) (35.16 kg/cm$^2$) to about 1,500 psi. (105.46 kg/cm$^2$), and preferably about 600 psi. (42.18 kg/cm$^2$) to about 1,500 psi. (105.46 kg/cm$^2$) for a time period of about 2 minutes to about 10 minutes, more typically about 2 minutes to about 6 minutes, and preferably about 2 minutes to about 5 minutes. Typical of the compression molding presses used in the practice of this art is a Williams White 1500 ton compression molding press manufactured by Williams White Company, (Moline, Ill.).

The molded plates are then surface ground to achieve a uniform thickness. Surface grinding is done with grinding equipment conventional in the art. Coarse (about 60 grit) grinding media should be used first to minimize blinding of the grinding media and then fine (about 180 grit) grinding media can be used to obtain the finish desired. Separator plates made solely from coke particles tend to blind up abrasive surfaces rapidly requiring replacement of the abrasive surface. Blinding is the clogging or filling of the abrasive surface with material. However, separator plates made from coke and graphite particles do not blind the abrasive surfaces as rapidly resulting in significant time and material savings.

Once the plates have been ground to the size required, the next step in the process is the carbonization of the phenolic resin. That is, the phenolic resin must be converted to carbon by controlled decomposition of the carbon hydrogen bonds in the resin. The carbonization process is accomplished in a conventional gas fired convection oven with a retort and computerized controls. The plates are typically stacked in the oven in such a manner that the plates are restrained to maintain flatness, the retort is then purged with nitrogen or an inert gas, and the plates are exposed to a controlled heat-up cycle wherein the temperatures are typically about 1,200° F. (649° C.) to about 2,000° F. (1093° C.), more typically about 1,200° F. (649° C.) to about 1,850° F. (1010° C.), and preferably about 1850° F. (1010° C.)

for a sufficient amount of time to achieve carbonization without adversely affecting the plate characteristics by permitting the gaseous by-products of the carbonization process to slowly be removed from the plate interior. The preferred cycle time is about 100 hours to about 200 hours.

Once the plates have been carbonized, the next step is the graphitization process. The plates are graphitized at temperatures of about 2,100° C. to about 3,000° C., more typically about 2,200° C. to about 3,000° C., and preferably about 2,650° C. to about 2,850° C. The graphitization process is an electrical heating process in which the plates are connected to a current source, and, sufficient current is passed through the resistive load to produce the graphitization temperatures. The process used is the Acheson process in which a standard graphitization cycle, known in the art, is used to graphitize the plate.

The finished plates of this invention typically have a nominal thickness of about 0.025 (0.64 millimeter (mm.)) inch to about 0.036 inch (0.91 mm.), more typically about 0.028 inch (0.71 mm.) to about 0.033 inch (0.84 mm.), and preferably about 0.030 inch (0.76 mm.). The molded plate, prior to carbonization and graphitization, is approximately 15% oversized to compensate for shrinkage during the carbonization and graphitization processes. The electrochemical separator plates of this invention typically can have a nominal size of up to about 16 square feet, although, nominal sizes of about 12.7 cm by 12.7 cm to about 61 cm by 69 cm are particularly useful. These plates are quite dense, generally about 1.95 g/cm$^3$. These plates also have very low porosities.

The separator plates of this disclosure can be used in conventional electrochemical cells and are particularly adapted for use in conventional fuel such as are described in commonly assigned U.S. Pat. No. 4,345,008, the disclosure of which is incorporated by reference.

It is contemplated that the separator plates of this invention will have multiple uses in addition to use as separator plates in fuel cells. The plates can be used as battery separators, the plates can also be used as ionic membrane cell separators, or the plates can be used in any system or chemical process requiring a separating barrier constructed of an inert conductive material.

The following example is illustrative of the principles of practice of this invention although not limited thereto.

EXAMPLE

A separator plate was made by initially mixing 50% filler with 50% phenolic resin until a homogeneous mixture was produced. The filler consisted of 40% Airco-Speer grade 90 coke and 60% Airco-Speer grade 60 graphite; the graphite having been air classified to remove particles of less than 15 microns in size before being used in this work. The coke and the graphite were manufactured by Airco-speer Carbon-graphite Company, (St. Mary's, Pa.). The coke particles had an average aspect ratio of less than 0.4 and a particle size distribution such that 80% of the particles were less than 44 microns in size and 100% of the particles were less than 150 microns in size. The graphite particles also had an average aspect ratio of less than 0.4 and a particle size distribution such that 100% of the particles were larger than 15 microns in size, about 80% of the particles were 50 to 100 microns in size, and 100% of the particles were less than 120 microns in size. The resin used was Plenco No. 1436, manufactured by the Plastics Engineering Company (Sheboygan, Wis.). The fillers and resin were mixed for about one minute in a laboratory waring blender.

The molding mixture was then preformed by cold compression in a mold at 3000 psig. (210.9 kg/cm$^2$). The preform was then molded into a separator plate having a length of about 6 inches (15.2 cm), a width of about 6 inches (15.2 cm), and a thickness of about 0.050 inches (0.013 cm). The plate was both preformed and molded in a 200 ton laboratory, compression molding press manufactured by Baldwin-Defiance, Inc. (Broomal, Pa.). Molding was accomplished at a temperature of about 300° F. (149° C.) and a pressure of about 5000 psig (351.6 kg/cm$^2$) for about 3 minutes. Shims placed along side of the top punch were used to set the plate thickness. Flashing (excess compound) on all four edges of the molded plate indicated that sufficient material flow had occurred for the plate to reach near theoretical molded density. The molded plate was then surface sanded to break the phenolic film, and loaded into an inconel 600 retort with other plates. The retort was placed in a Lindberg Hevi-Duty Furnace (Lindberg Co.) and heated to 1850° F. (1010° C.) to carbonize the part. A continuous N$_2$ purge of the retort during heating and cooling allowed the thermal decomposition of the resin. The carbonizing heating cycle used is described in commonly assigned U.S. Pat. No. 4,301,222 the disclosure of which is hereby incorporated by reference. The plate was next graphitized using a conventional acheson graphitization process by placing the plate in a conventional acheson graphitization furnace and passing a sufficient current through the plate until a temperature of 2650° C. was reached. The plate was held at this temperature for at least one hour. The graphitizing cycle temperature—time profile is described in commonly assigned U.S. Pat. No. 4,301,222. The graphitized plate had a length of 5.25 inches (13.3 cm), a width of 5.25 inches (13.3 cm) and a thickness of about 0.045 inches (0.11 cm).

A comparison of the plate characteristics of representative coke-graphite particle plates with the coke particle plates of copending application Ser. No. 686,063 is presented in Table III.

TABLE III

|  | Coke Particle Plate | Coke-Graphite Particle Plate |
| --- | --- | --- |
| Density g/cm$^3$ | 1.93[1] | 1.956 |
| Flexural Modulus g/cm$^2$ absolute | 84.4 | 66 |
| Flexural Strength kg/cm$^3$ | 617[2] | 352 |

[1]Slight variations are a result of different processing runs.
[2]Strengths varied from 394 kg/cm$^2$ to 619 kg/cm$^2$ due to different processing runs.

These plates have an improved balance of properties desired for cell separator plates. These properties include but are not limited to density, flexural modulus, and flexural strength. For example, the graphitized electrochemical plates of this invention will typically have a density of about 1.88 g/cm$^3$ to about 1.95 g/cm$^3$, more typically about 1.90 g/cm$^3$ to about 1.94 g/cm$^3$, and typically greater than about 1.88 g/cm$^3$. Increased density results in a plate with decreased wetted area. Wetted area is related to corrosion threshold. Increased density and resulting decreased wetted area result in lower measured corrosion current at the same current density. This increases separtor plate life and thus cell life.

The separator plates of this invention have higher densities than the graphite particle plates of the prior art and thus exhibit improved properties. These properties include thermal conductivity, electrical resistivity, and hydrogen permeability. For example, due to the significant quantities of heat generated during the operation of a typical fuel cell it is important that the cell have high thermal conductivity.

The plates of this invention have a flexural modulus less than that of coke filled separator plates. Flexural modulus is a measure of the stiffness and toughness of the plate. Separator plates must have sufficiently high flexural modulus to resist deformation and yet too high a flexural modulus is not desirable. High flexural modulus requires additional safety factors in the design of a cell stack. Thus, although a coke separator plate has an acceptable flexural modulus, it is preferred that it be lower.

The plates of the present invention will have sufficient structural integrity to withstand typical fuel cell operation of about 40,000 hours at a temperature of about 400° F. (204° C.). The primary parameter which is a good indicator of the structural longevity of a separator plate is the retention of flexural strength as a result of good corrosion resistance. Flexural strength is defined as the upper limit of plate bending without cracking. The plates of the present invention have initial flexural strengths of typically about 4,000 psi (281 kg/cm$^2$) to about 9,000 psi (633 kg/cm$^2$), and more typically about 5,000 psi (352 kg/cm$^2$) to about 7,000 psi (492 kg/cm2).

These molded plates provide a surface more susceptible to the required surface grinding then similar plates made from coke. In addition, it should be noted that coke particle separator plates are more economical to manufacture since coke typically has a cost below that of graphite due to the high energy input required to manufacture graphite. The process of the present invention is energy efficient since the coke is converted to graphite during the separator plate graphitization process. The graphite particle plates of the prior art must still be graphitized resulting in a wasted expenditure of energy required to bring the graphite particles up to the graphitizing temperature. Accordingly, the overall manufacturing process is more energy efficient when coke particles are used in the separator plates versus graphite particles.

It should be understood that the invention is not limited to the particular embodiments shown and described herein, but that various changes and modifications may be made without departing from the spirit and scope of this novel concept as defined by the following claims.

I claim:

1. An electrochemical cell separator plate comprising a molded, carbonized and graphitized product formed from a carbonizable and graphitizable molding composition wherein the improvement utilizing a carbonizable and graphitizable molding comprises composition comprising:
   about 40 weight % to about 60 weight % of carbonizable resin; and
   about 60 weight % to about 40 weight % of a coke-graphite mixture;
   said coke particles having size less than 149 microns and said graphite particles having size less than 120 microns.
   the coke-graphite mixture comprising about 30 weight % to about 90 weight % of coke particles and about 70 weight % to about 10 weight % of graphite particles.

2. The separator plate of claim 1 wherein the coke has a particle size distribution such that about 50% to about 80% of the coke particles are less than about 44 microns in size and substantially all coke particles are less than 149 microns in size.

3. The separator plate of claim 1 wherein the graphite has a particle size distribution such that about 0% to about 5% of the graphite particles are less than about 15 microns in size, about 95% to about 100% of the graphite particles are less than 120 microns in size and about 50% to 60% of the graphite particles are about 50 to about 60 microns in size.

4. The separator plate of claim 1 wherein the carbonizable resin is a carbonizable phenolic resin such as a phenol-aldehyde resol or a phenol-aldehyde novolac.

5. An electrochemical fuel cell separator plate wherein the plate is formed from a carbonizable and graphitizable molding composition by molding at sufficient heat and pressure to densify the plate, grinding the plate surface and then heating at a sufficient temperature to carbonize and then graphitize the plate, wherein the improvement comprises using as the molding composition a mixture comprising:
   about 40 weight % to about 60 weight % of carbonizable resin; and
   about 60 weight % to about 40 weight % of a coke-graphite mixture;
   said coke particles having size less than 149 microns and said graphite particles having size less than 120 microns.
   the coke-graphite mixture comprising about 30 weight % to about 90 weight % of coke particles and about 70 weight % to about 10 weight % of graphite particles.

6. The separator of claim 5 wherein the coke has a particle size distribution such that about 50% to about 80% of the coke particles are less than about 44 microns in size and substantially all coke particles are less than 149 microns in size.

7. The separator plate of claim 5 wherein the graphite has a particle size distribution such that up to about 5% of the graphite particles are less than about 15 microns in size, about 95% to about 100% of the graphite particles are less than 120 microns in size and about 50% to 60% of the graphite particles are about 50 microns to about 60 microns in size.

8. The separator plate of claim 5 wherein the carbonizable resin is a carbonizable phenolic resin such as a phenol-aldehyde resol or a phenol-aldehyde novolac.

9. A fuel cell comprising at least one anode, at least one cathode, electrolyte material and at least one carbonized and graphitized separator plate formed from a carbonizable and graphitizable molding composition, wherein the improvement comprises utilizing a carbonizable and graphitizable molding composition comprising:
   about 40 weight % to about 60 weight % of carbonizable resin; and
   about 60 weight % to about 40 weight % of a coke-graphite mixture;
   said coke particles having size less than 149 microns and said graphite particles having size less than 120 microns.
   the coke-graphite mixture comprising about 30 weight % to about 90 weight % of coke particles and about 70 weight % to about 10 weight % of graphite particles.

10. The fuel cell of claim 9 wherein the coke has a particle size distribution such that about 50% to about 80% of the coke particles are less than about 44 microns in size and essentially all coke particles are less than 149 microns in size.

11. The separator plate of claim 9 wherein the graphite has a particle size distribution such that up to about 5% of the graphite particles are less than about 15 microns in size, about 95% to about 100% of the graphite particles are less than 120 microns in size and about 50% to 60% of the graphite particles are about 50 microns to about 60 microns in size.

12. The fuel cell of claim 9 wherein the carbonizable resin is a carbonizable phenolic resin such as a phenol-aldehyde resol or a phenol-aldehyde novolac.

* * * * *